United States Patent [19]

Efford et al.

[11] Patent Number: 4,803,598
[45] Date of Patent: Feb. 7, 1989

[54] ELECTROLYTIC CAPACITOR ASSEMBLY

[75] Inventors: Thomas W. Efford; Lester C. Dain, both of West Jefferson, N.C.

[73] Assignee: Sprague Electric Company, North Adams, Mass.

[21] Appl. No.: 145,440

[22] Filed: Jan. 19, 1988

[51] Int. Cl.⁴ .............................................. H01G 9/00
[52] U.S. Cl. .................................................. 361/541
[58] Field of Search .................... 361/330, 433, 328

[56] References Cited

U.S. PATENT DOCUMENTS

| | | | |
|---|---|---|---|
| 789,877 | 5/1905 | Perry | 361/433 X |
| 3,261,902 | 7/1966 | Pearce et al. | 361/433 X |
| 3,277,350 | 10/1966 | Pearce et al. | 361/433 |
| 3,439,234 | 4/1969 | Braiman et al. | 361/433 |
| 3,838,316 | 9/1974 | Brown et al. | 317/101 R |
| 4,017,773 | 4/1977 | Cheseldine | 361/433 |
| 4,045,862 | 9/1977 | Evans | 29/570 |
| 4,061,224 | 12/1977 | Fuhri | 206/1.7 |
| 4,104,704 | 8/1978 | Weaver | 361/433 |
| 4,326,237 | 4/1982 | Markarian et al. | 361/328 X |
| 4,447,852 | 5/1984 | Clement | 361/306 |
| 4,547,829 | 10/1985 | Efford et al. | 361/306 |
| 4,617,611 | 10/1986 | Miura et al. | 361/433 |

FOREIGN PATENT DOCUMENTS

| | | | |
|---|---|---|---|
| 1445807 | 8/1976 | United Kingdom | 361/433 |
| 2123608 | 2/1984 | United Kingdom | 361/433 |

Primary Examiner—Donald A. Griffin

[57] ABSTRACT

A plurality of electrolytic capacitor sections are sealed within a common cube-like case. An internal wall divides the case into isolated chambers. Upon sealing of the case, the assembly takes up substantially no more space on a circuit board than an individual capacitor of the prior art. Each capacitor chamber has its own vent located in the case at the junction of a side wall (parallel to the internal wall) and the top wall by means of a bevel which reduces the walls to the desired vent thickness.

5 Claims, 1 Drawing Sheet

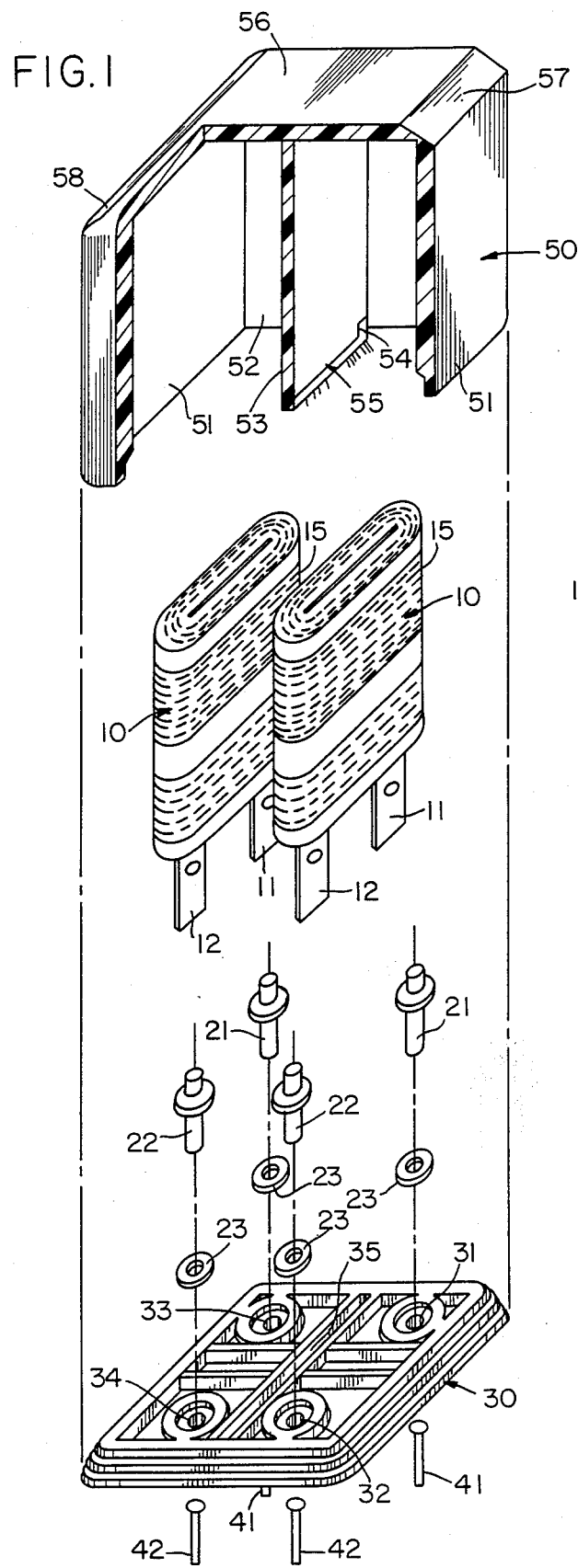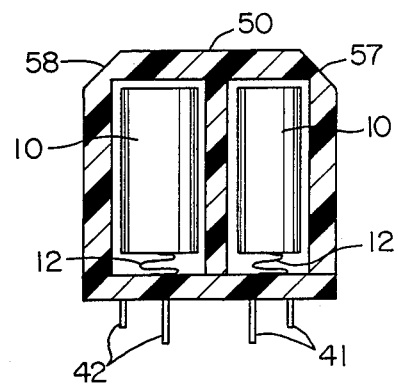

ELECTROLYTIC CAPACITOR ASSEMBLY

BACKGROUND OF THE INVENTION

This invention relates to an electrolytic capacitor assembly, and more particularly to such an assembly wherein a plurality of electrolytic capacitor section are isolated within a single housing.

Clement in U.S. Pat. No. 4,447,852 issued May 8, 1984, and Efford et al in U.S. Pat. No. 4,547,829 issued Oct. 15, 1985, both teach single capacitors in ultrasonically sealed plastic housings which have a low profile for use where spacing between adjacent printed circuit boards (pcb) is at a premium. Clement also teaches an upright single capacitor for use where space on a single pcb is at a premium. The present invention in its preferred embodiment provides two capacitors in a single housing which requires only substantially the space and mounting arrangement of an individual prior art capacitor.

A feature of the present invention is an assembly which can be used where board space is at a premium, and where it is desirable to provide high package density, low ESR, and low inductance for switched-mode power supply input and output filtering.

SUMMARY OF THE INVENTION

In accordance with this invention a capacitor assembly has at least two independent electrolytic capacitors in a single housing, and each capacitor in a tab-wound foil section with a separate electrode tab connected to each electrode. These tabs extend from the same side of the capacitor section, and each is connected to conductive means which extend through the base of the housing case. Such sections are known to provide low ESR and low inductance. The holes in the base through which the conductive means pass are spaced dissimilarly so that, when external terminations are connected to the conductive means, there is only one way to mount the capacitor assembly on a printed circuit board.

Each capacitor is a wound and flattened tab-wound electrolytic capacitor section having at least one electrode tab connected to each electrode foil. Tab-wound is a descriptor for a convolute winding of overlying electrode foils interleaved with dielectric spacers which extend laterally beyond both edges of the electrodes. Access to the electrodes is by way of tabs which extend out of one or both sides of the winging.

Conductive means are connected to the tabs and extend through the base. The cover portion of the housing case has at least one interior wall which divides the case into compartments. A bottom portion of this interior wall fits into a groove or channel in the base, so that when the assembly is sealed there are at least two isolated, independent capacitors provided thereby.

The housing or case for the capacitor assembly is a cube-like parallelepiped consisting of a cover portion and a base portion. The cover portion has at least one vertical internal wall dividing the cover into isolated compartments. When the housing is sealed, the compartments are isolated from each other, thereby providing for at least two independent capacitors in a single housing.

There is at least one vent located in the cover, and preferably each capacitor has its own vent. The vent is located on an upper surface of the cover along the juncture of a side wall and the top surface of the cover and parallel to the plane of the vertical internal wall.

BRIEF DESCRIPTION OF THE DRAWINGS

FIG. 1 is an expanded perspective view of the capacitor assembly of the present invention with the cover being cut away for clarity.

FIG. 2 is a front view of the completed assembly of FIG. 1 with the front face removed to show internal mounting.

DESCRIPTION OF THE PREFERRED EMBODIMENT

The Figures show an electrolytic capacitor assembly wherein a pair of capacitor sections 10 are housed in isolation from one another in a substantially cube-like rectangular parallelepiped case having a cover 50 and a base 30. Each capacitor section 10 is tab-wound and flattened in a usual manner with an electrode tab 11 connected to an anode foil and electrode tab 12 attached to a cathode foil during winding. Interleaved spacer material 15 preferably of paper, separates the foil electrodes which are preferably aluminum foil.

Conductive means 21 and 22 are attached to tabs 11 and 12, respectively. These conductive means are assembled with gaskets 23 and are attached to base 30 through holes 21, 32, 33 and 34. Securing is attained by upsetting the long shank ends of means 21 and 22 by conventional techniques. Conductive members 41 and 42 are attached to means 21 and 22, respectively, also by conventional techniques.

Holes 31 through 34 are dissimilarly spaced apart in base 30 so that when members 41 and 42 are attached, or other mounting means are used, there is only one way of mounting the assembly on a printed circuit board. There are conventional raised indicia (not shown) indicating the polarity of each capacitor on the exterior of base 30. These indicia serve also as standoffs for flushing the pcb board after all components have been attached thereto.

Base 30 has molded into it a longitudinal groove or channel 35 to receive portion 55 of internal wall 53 of cover 50 as described below.

Cover 50 has an internal vertical wall 53 extending from back wall 52 to the front wall (cut away). Wall 53 is parallel to side walls 51 and separates the interior of cover 50 into two isolated compartments.

The bottom edge of wall 53 is notched adjacent to bottom edge of the back wall 52 as indicated at 54 and also correspondingly at the front. The notched portions rest on the edge of base 30 and portion 55 of wall 53 is received by channel 35 of base 30 so that when the assembly is sealed each capacitor section 10 is isolated from the other.

Cover 50 and base 30 are preferably made of Ryton, a polyphenylene sulfide polymer, and are preferably sealed by ultrasonic welding as taught in the prior art by both Clement and Efford et al noted above.

Cover 50 bears vent mechanisms 57 and 58 for each of the two chambers enclosing capacitor sections 10 in the preferred embodiment. Each vent lies on the exterior junction of a side wall 51 and top surface 56 of cover 50. Vents 57 and 58 each extend parallel to interior wall 53, but on the exterior surface of cover 50. Each vent is a beveled portion formed by eliminating material from the right-angle junction of the two perpendicular surfaces. The elimination of material thins cover 50 thickness to 0.037 (0.94 mm) along the bevel vents 57 and 58. This thickness will withstand an internal pressure of 75 psi before venting.

The beveled vents are preferably provided in the cover during the molding of the cover. Utilization of a mold having the bevel formed therein permits the attainment of extremely reproducible vent thickness in a production-scale run of covers. The bevels may also be formed by grinding or slicing away corner material after the case is sealed; however, stresses may be formed in the cover, and uniformity suffers in comparison to molding the vent in place.

When the internal pressure in either chamber exceeds the above venting pressure, the side wall associated with that chamber parts from the top along the bevel as a smooth gap, instead of a sharp rupture as is usual with groove or slit-type vents. A sharp rupture, particularly when the vent is located along the top of the capacitor housing, could damage an adjacent circuit board, particularly if board spacing is close.

The capacitor sections 10 may be impregnated with electrolyte (not shown) before sealing the unit or after sealing through holes in the base which are then filled with plastic.

What is claimed is:

1. An electrolytic capacitor assembly comprising a plurality of tab-wound capacitor sections, each of said sections having at least one electrode tab connected to one electrode foil and extending from said section, at least one other electrode tab connected to another electrode foil and extending from said section, a rectangular parallelepiped case having an insulating cover and an insulating base, a conductive termination attached at one end to each of said tabs and passing out of said case through said base, at least one vertical wall inside said case dividing said case interiorly into isolated chambers, each of said chambers containing one of said sections, at least one vent located in said cover at a junction of a top surface of said cover and a side wall of said cover parallel to said vertical wall, whereby under internal pressure said side wall parts as a smooth gap from said top surface, said cover being sealed to said base including an edge of said vertical wall being sealed to said base.

2. The electrolytic capacitor assembly of claim 1 wherein said vertical wall has a notched bottom portion adjacent each bottom of a side wall to which it is joined, said notched portions being sealed to edge portions of said base, and a remaining portion of said wall being received by a channel in said base and being sealed thereto, thus providing said isolated chambers.

3. The electrolytic capacitor assembly of claim 1 wherein each of said isolated chambers has one of said vents.

4. The electrolytic capacitor assembly of claim 1 wherein said vent lies on an exterior portion of said cover.

5. The electrolytic capacitor assembly of claim 4 wherein said vent is a beveled portion lying along said junction.

* * * * *